(12) United States Patent
Liu et al.

(10) Patent No.: US 12,287,671 B2
(45) Date of Patent: Apr. 29, 2025

(54) WEARABLE DEVICE AND MANUFACTURING METHOD THEREOF

(71) Applicant: HTC Corporation, Taoyuan (TW)

(72) Inventors: Chang-Hsueh Liu, Taoyuan (TW); Jen-Tsung Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 222 days.

(21) Appl. No.: 18/173,800

(22) Filed: Feb. 24, 2023

(65) Prior Publication Data

US 2024/0053793 A1 Feb. 15, 2024

Related U.S. Application Data

(60) Provisional application No. 63/396,608, filed on Aug. 10, 2022.

(51) Int. Cl.
*G06F 1/16* (2006.01)

(52) U.S. Cl.
CPC .................................. *G06F 1/163* (2013.01)

(58) Field of Classification Search
CPC ....................................................... G06F 1/163
See application file for complete search history.

(56) References Cited

U.S. PATENT DOCUMENTS

| 9,861,314 | B2 | 1/2018 | Haverinen et al. |
| 11,051,704 | B1 | 7/2021 | Tran |
| 2012/0092822 | A1* | 4/2012 | Mooring ............... G06F 1/1632 361/679.21 |
| 2022/0057832 | A1 | 2/2022 | von Badinski et al. |

FOREIGN PATENT DOCUMENTS

| EP | 3789514 | 3/2021 |
| TW | I534592 | 5/2016 |
| TW | I570400 | 2/2017 |
| TW | 201900103 | 1/2019 |

OTHER PUBLICATIONS

"Office Action of Taiwan Counterpart Application", issued on Jul. 17, 2023, p. 1-p. 10.

* cited by examiner

*Primary Examiner* — James Wu
(74) *Attorney, Agent, or Firm* — JCIPRNET

(57) ABSTRACT

A wearable device and a manufacturing method thereof are provided. The wearable device includes an annular body and a package body. The annular body has an inner chamber. The package body is assembled into the inner chamber. There is an assembly gap between the package body and a chamber wall of the inner chamber. The package body includes a package material and an electronic component. The electronic component is embedded in the package material and closely combined with each other.

3 Claims, 5 Drawing Sheets

WEARABLE DEVICE AND MANUFACTURING METHOD THEREOF

CROSS-REFERENCE TO RELATED APPLICATION

This application claims the priority benefit of U.S. provisional application Ser. No. 63/396,608, filed on Aug. 10, 2022. The entirety of the above-mentioned patent application is hereby incorporated by reference herein and made a part of this specification.

BACKGROUND

Technical Field

The application relates to a device and a manufacturing method of the device, and in particular to a wearable device and a manufacturing method of the wearable device.

Description of Related Art

Virtual reality (VR) technology is becoming more and more popular. When operating a virtual reality device, if you want to control it in a hands-free state or need to track other objects or other body parts, you must bind a controller to the object or body. However, the volume and weight of the controller prevent a user from having better nimbleness and convenience during the operation. Therefore, how to effectively reduce the volume and weight of the controller is also a problem that needs to be overcome.

SUMMARY

The application provides a wearable device and a manufacturing method of the wearable device, which can improve the problem of poor operational nimbleness and have wide applicability.

The wearable device of the application includes an annular body and a package body. The annular body has an inner chamber. The package body is assembled into the inner chamber. There is an assembly gap between the package body and a chamber wall of the inner chamber. The package body includes a package material and an electronic component. The electronic component is embedded in the package material and closely combined with each other.

The manufacturing method of the wearable device of the application includes the following steps. An electronic component is embedded in an uncured package material. The package material is cured. Part of the cured package material is removed to form a package body. The package body is assembled into an inner chamber of an annular body. There is an assembly gap between the package body and a chamber wall of the inner chamber.

Based on the above, in the wearable device and the manufacturing method of the wearable device of the application, the volume and weight of the package body may be reduced as much as possible, so that the whole wearable device has the operational nimbleness and convenience.

DESCRIPTION OF THE EMBODIMENTS

Figure 1:
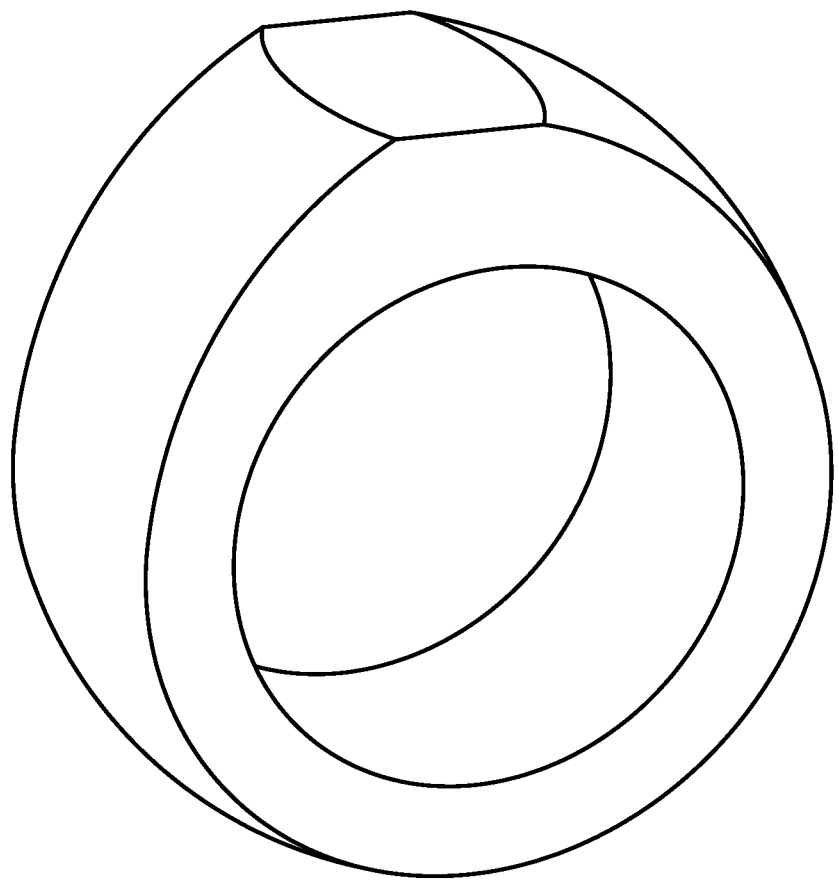
FIG. 1 is a schematic view of a wearable device according to an embodiment of the invention.
Figure 2A:
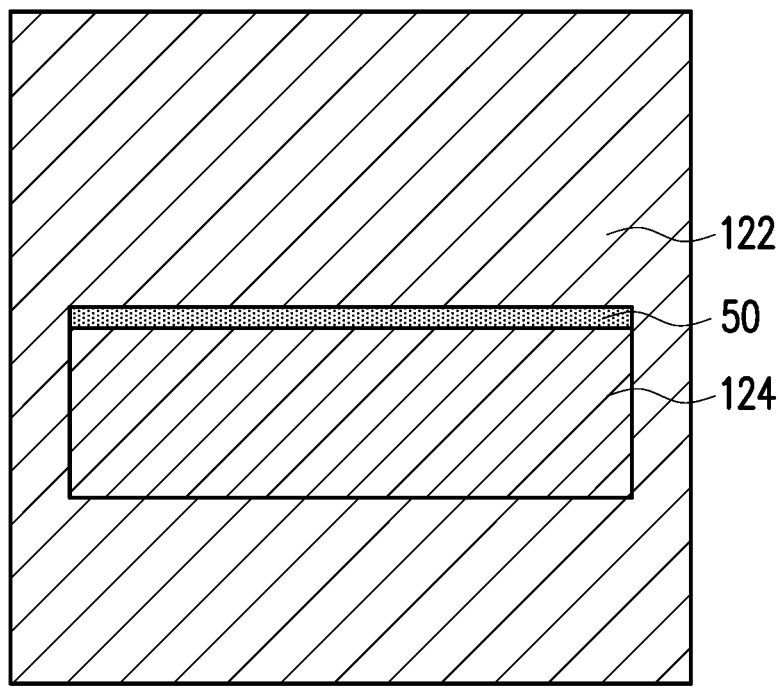
FIG. 2A to FIG. 2C are cross-sectional views of a process of a manufacturing method of a wearable device according to an embodiment of the invention.
Figure 2B:
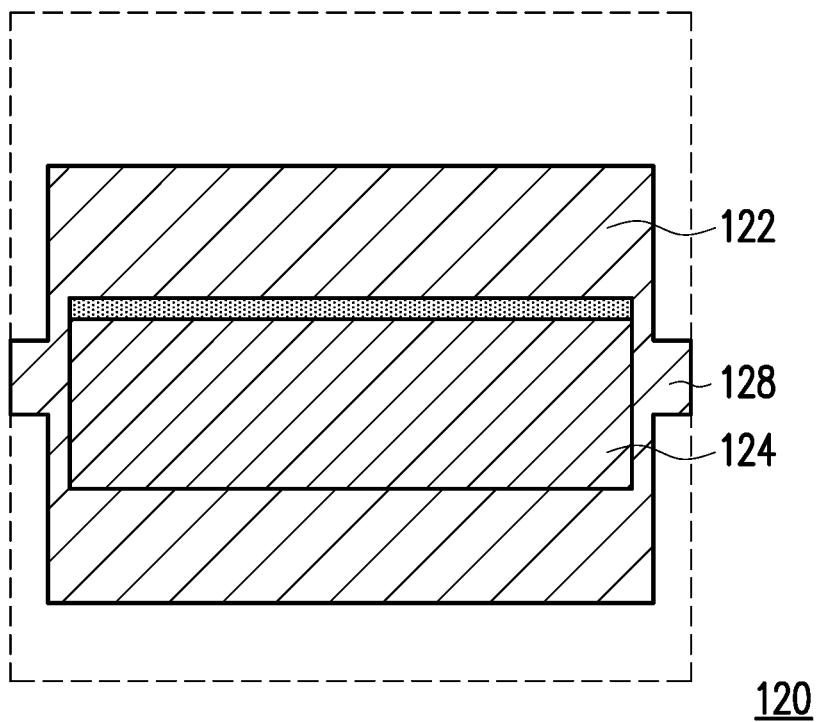
Figure 2C:
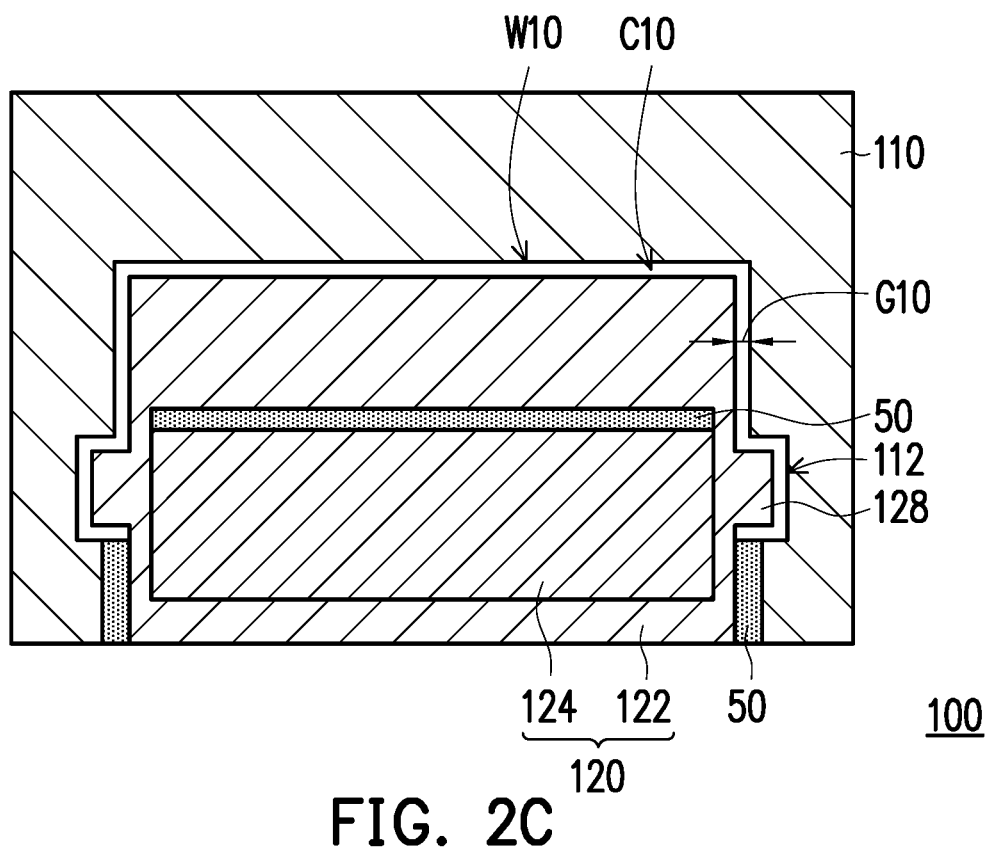

FIG. 1 is a schematic view of a wearable device according to an embodiment of the invention. FIG. 2A to FIG. 2C are cross-sectional views of a process of a manufacturing method of a wearable device according to an embodiment of the invention. Please refer to FIG. 1 and FIG. 2C. A wearable device 100 of this embodiment includes an annular body 110 and a package body 120. The annular body 110 has an inner chamber C10. The package body 120 is assembled into the inner chamber C10. There is an assembly gap G10 between the package body 120 and a chamber wall W10 of the inner chamber C10. The package body 120 includes a package material 122 and an electronic component 124. The electronic component 124 is embedded in the package material 122 and closely combined with each other. The electronic component 124 and the package material 122 closely combining with each other means that there is no apparently visible gap between the two, and the structure must be destroyed to separate the two.

In this embodiment, since the electronic component 124 is embedded in the package material 122, a good waterproof effect can be obtained indeed. Moreover, there is the assembly gap G10 between the package body 120 and the chamber wall W10 of the inner chamber C10, which means that the package body 120 is not directly formed in the inner chamber C10. Since the package body 120 is not directly formed in the inner chamber C10, the package body 120 may be shaped after forming the package body 120 and before being assembled into the inner chamber C10, so that the volume of the package body 120 may be minimized. In this way, the volume and weight of the whole wearable device 100 may be reduced, allowing a user to have better nimbleness and convenience when operating the wearable device 100.

Contrary to this application, when the package body is directly formed in the inner chamber, in order to allow the package material to flow in the inner chamber, a sufficiently large gap must be maintained between the electronic component and the inner chamber, so the volume of the inner chamber of this manufacturing method is relatively large, thereby increasing the volume and weight of the whole wearable device. That is, compared with the package body directly formed in the inner chamber, the wearable device 100 has a compact size and light weight according to an embodiment of the invention shown in FIG. 1 and FIG. 2A to FIG. 2C.

The wearable device 100 of this embodiment has a shape like a ring, but a shape of the wearable device 100 may also be a shape like a bracelet, an arc shape, an L shape, or a ring with a gap, or other shapes, and the application is not limited to this.

The electronic component 124 may include a motion sensor for sensing motion of the wearable device 100 and generating motion information. The motion sensor may be an inertial measurement unit (IMU). For example, the motion sensor may be a six degrees of freedom (6-DOF) IMU or a nine degrees of freedom (9-DOF) IMU, in which the 6-DOF IMU may output linear acceleration values of X, Y, and Z axes and angular velocity values of the X, Y, and Z axes. The 9-DOF IMU may output the linear acceleration values of the X, Y, and Z axes, the angular velocity values of the X, Y, and Z axes, and magnetic force values of the X, Y, and Z axes. More specifically, the 6-DOF IMU includes a three-axis accelerometer and a three-axis gyroscope. The 9-DOF IMU includes the three-axis accelerometer, the three-axis gyroscope, and a three-axis magnetometer. In other embodiments, the electronic component 124 may also include a wireless transmission module electrically connected to the motion sensor, so as to wirelessly transmit the motion information to other devices.

In other embodiments, the electronic component 124 may also include a point light source, a lens, a light sensor, a vibrator, a speaker, a biological information sensor, other electronic modules or a combination thereof. In other words, the wearable device 100 may provide various functions according to requirements, and is not limited to the functions mentioned in the above embodiments. In addition, the biological information sensor may output electrocardiography (ECG) data or photoplethysmography (PPG) signals.

The package body 120 of this embodiment may further have a locking block 128. The annular body 110 has a locking slot 112. The locking block 128 is placed in the locking slot 112. The assembly of the package body 120 and the annular body 110 may be guided by using the cooperation of the locking block 128 and the locking slot 112, and the package body 120 may be accurately assembled to a preset position.

A manufacturing method of a wearable device according to an embodiment of the invention includes the following steps. Please refer to FIG. 2A. Firstly, the electronic component 124 is embedded in the uncured package material 122. For example, the electronic component 124 is placed and fixed in a mold (not illustrated), and then the package material 122 is filled in a cavity of the mold and make the package material 122 cover the electronic component 124. The step of filling the package material 122 may be to perform an embedding injection process, such as a low pressure molding (LPM). The package material 122 may be epoxy. A fixing method of the electronic component 124 in the cavity of the mold may be mold insert pin clamping, or a filling material may be formed into a local shape to fix the electronic component 124. The fixing method may be a tape 50 attachment, glue dispensing, or otherwise. Then, the package material 122 is cured.

Please refer to FIG. 2B. Next, a part of the cured package material 122 is removed to form the package body 120. In this embodiment, the step of removing the part of the cured package material 122 is to perform a computer numerical control (CNC) processing, so the unnecessary package material 122 may be accurately removed. Contrary to this application, if the package body is to be formed directly in the inner chamber, in order to allow the package material to flow in the inner chamber, a sufficiently large gap must be maintained between the electronic component and the inner chamber, so the volume of the inner chamber is relatively large, and there is no chance to remove an unnecessary part of the package body after forming, which increases the volume and weight of the whole wearable device.

Please refer to FIG. 2C. Next, the package body 120 is assembled into the inner chamber C10 of the annular body 110. There is the assembly gap G10 between the package body 120 and the chamber wall W10 of the inner chamber C10. So far, the manufacturing of the wearable device 100 of this embodiment is roughly completed.

In this embodiment, the step of assembling the package body 120 to the annular body 110 is to perform the tape 50 attachment, but screw locking, glue dispensing, ultrasonic welding, or other assembling methods may also be adopted.

A material of the annular body 110 may be plastic, metal, elastic material, or other materials.

FIG. 3A to FIG. 3D are cross-sectional views of a process of a manufacturing method of a wearable device according to another embodiment of the invention. The manufacturing method of the wearable device of this embodiment is roughly similar to the method shown in FIG. 2A to FIG. 2C. Please refer to FIG. 3A. Firstly, the electronic component 124 is fixed to a carrier 226, and a fixing method may be the tape 50 attachment, glue dispensing, or other methods.

Figure 3A:
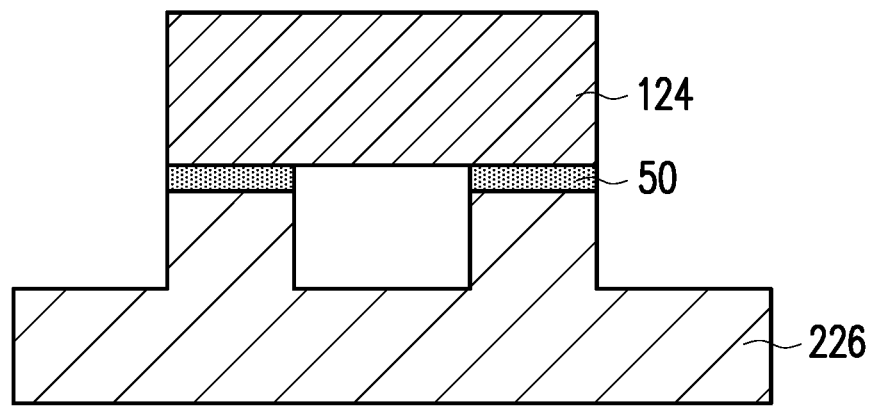
FIG. 3A to FIG. 3D are cross-sectional views of a process of a manufacturing method of a wearable device according to another embodiment of the invention.
Figure 3B:
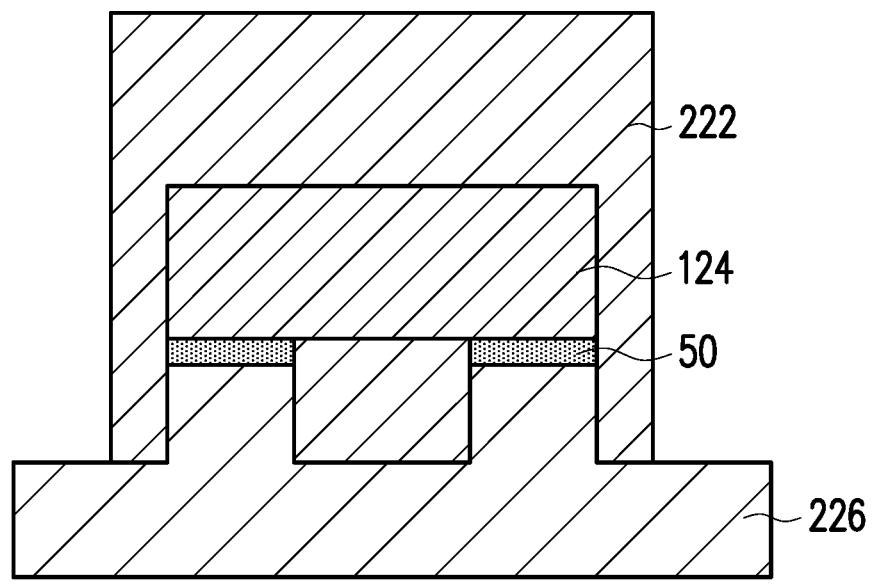

Please refer to FIG. 3B. Next, the electronic component 124 and the carrier 226 are placed and fixed in a mold (not illustrated), and then a package material 222 is filled in a cavity of the mold and make the package material 222 cover the electronic component 124 and the carrier 226. The step of filling the package material 222 may be to perform an embedding injection process, such as the LPM. The package material 222 may be epoxy. A fixing method of the electronic component 124 and the carrier 226 in the cavity of the mold may be mold insert pin clamping, or a filling material may be formed into a local shape to fix the electronic component 124 and the carrier 226. The fixing method may be the tape attachment, or glue dispensing, or otherwise. Then, the package material 222 is cured. In this way, the package material 222 is closely combined with the electronic component 124 and a part of the carrier 226. That is, another part of the carrier 226 may be exposed to the outside.

Figure 3C:
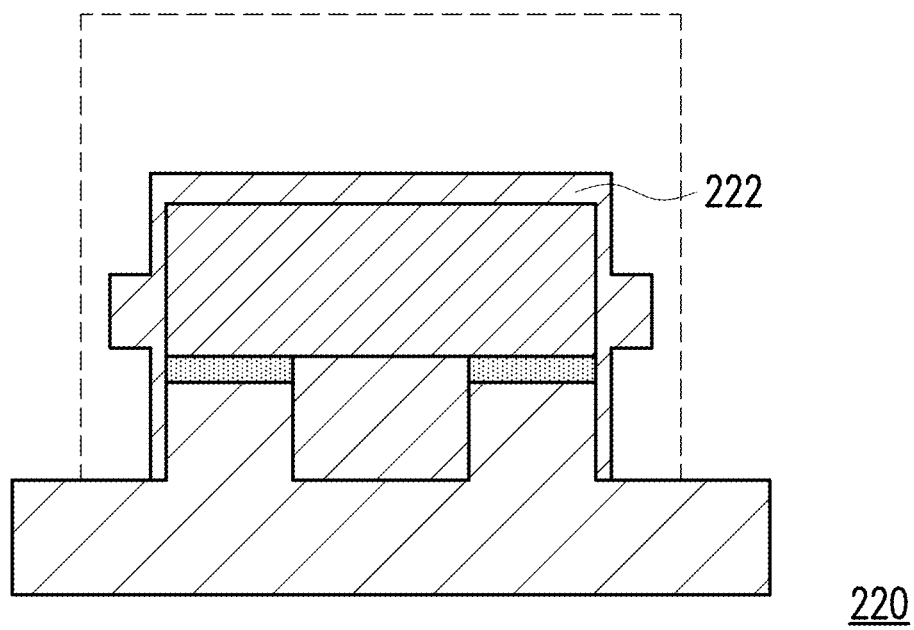

Please refer to FIG. 3C. Next, a part of the cured package material 222 is removed to form a package body 220. In this embodiment, the step of removing the part of the cured package material 222 is to perform the CNC processing, so the unnecessary package material 222 may be accurately removed.

Figure 3D:
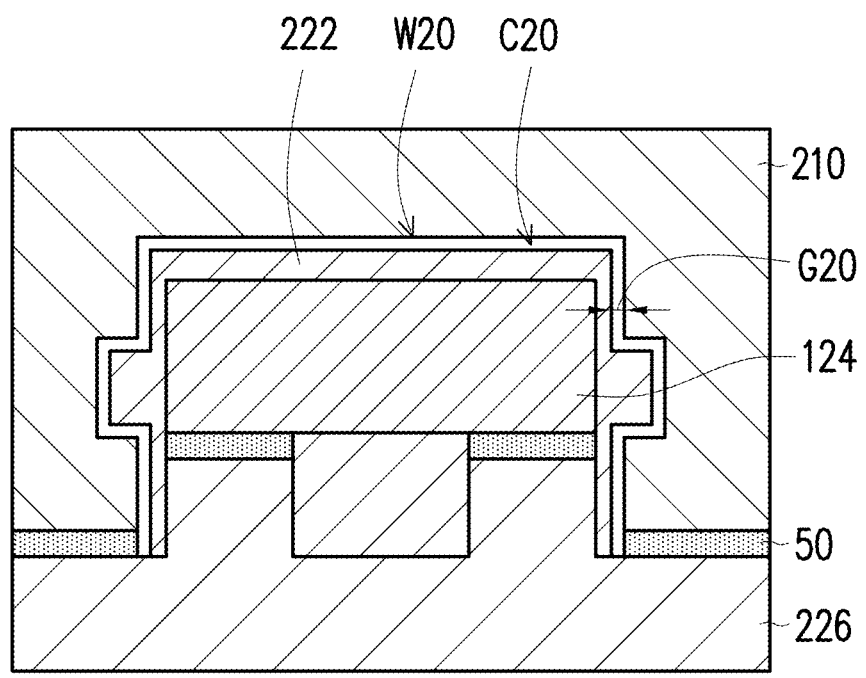

Please refer to FIG. 3D. Next, the package body 220 is assembled to an inner chamber C20 of an annular body 210. There is an assembly gap G20 between the package body 220 and a chamber wall W20 of the inner chamber C20. The step of assembling the package body 220 to the annular body 210 is to combine the carrier 226 to the annular body 210 to seal the inner chamber C20. Therefore, the carrier 226 and the annular body 210 jointly constitute the appearance of a wearable device 200, and may prevent external foreign objects, moisture, etc. from entering the inner chamber C20. So far, the manufacturing of the wearable device 200 of this embodiment is roughly completed.

In this embodiment, the step of assembling the carrier 226 to the annular body 210 is to perform the tape 50 attachment, but screw locking, glue dispensing, ultrasonic welding, or other assembling methods may also be adopted. A material of the annular body 210 may be plastic, metal, elastic material, or other materials. A material of the carrier 226 may be plastic, metal, elastic material, or other materials.

In summary, in the wearable device and the manufacturing method of the wearable device of the application, the manufacturing of the package body is completed first, and then assembled with the annular body, which can minimize the volume and weight of the package body, so that the whole wearable device has the operational nimbleness and convenience. Also, since the electronic component is embedded in the package material, a good waterproof effect can be obtained indeed.

What is claimed is:
1. A wearable device, comprising:
 an annular body having an inner chamber; and
 a package body, assembled into the inner chamber, wherein there is an assembly gap between the package body and a chamber wall of the inner chamber, the package body comprises a package material and an electronic component, the electronic component is embedded in the package material and closely combined with each other, there is no visible gap between the electronic component and the package material, and the electronic component and the package material are separated from each other only by destroying at least one of the electronic component and the package material.

2. The wearable device according to claim 1, wherein the package body further comprises a carrier, the electronic component is fixed to the carrier, the package material is closely combined with a part of the carrier, and the carrier is combined with the annular body and seals the inner chamber.

3. The wearable device according to claim 1, wherein the package body has protrusion, the annular body has a recess, and the protrusion is placed in the recess.

* * * * *